United States Patent [19]
Gill et al.

[11] Patent Number: 5,571,465
[45] Date of Patent: Nov. 5, 1996

[54] METHOD FOR MAKING FIBER-FILLED BOLSTERED CUSHION

[75] Inventors: Prem P. Gill, Rochester Hills; Paul W. Chrenka, Shelby Township, both of Mich.

[73] Assignee: General Motors Corporation, Detroit, Mich.

[21] Appl. No.: 573,771

[22] Filed: Dec. 18, 1995

[51] Int. Cl.$^6$ .................................................. B29C 35/04
[52] U.S. Cl. .......................................... 264/121; 264/122
[58] Field of Search .................................. 264/121, 122, 264/517, DIG. 69

[56] References Cited

U.S. PATENT DOCUMENTS

| | | |
|---|---|---|
| 3,739,397 | 4/1969 | Marshak ................................ 29/91 |
| 4,031,179 | 6/1977 | Tatzel .................................... 264/517 |
| 4,568,581 | 2/1986 | Peoples, Jr. ........................... 264/122 |
| 4,608,213 | 8/1986 | Kurumizawa et al. ................. 264/122 |
| 4,812,283 | 3/1989 | Farley et al. .......................... 264/518 |
| 5,111,579 | 5/1992 | Andersen ............................. 29/897.32 |
| 5,229,052 | 7/1993 | Billiu .................................... 264/115 |
| 5,366,678 | 11/1994 | Nomizo et al. ....................... 264/122 |
| 5,378,296 | 1/1995 | Vesa ..................................... 264/122 |
| 5,482,665 | 1/1996 | Gill ....................................... 264/113 |

*Primary Examiner*—Mary Lynn Theisen
*Attorney, Agent, or Firm*—Lawrence B. Plant

[57] ABSTRACT

Method and apparatus for quickly, and substantially uniformly, heating and cooling a bed of polymeric fibers having high melting point and low melting point fibers therein for softening the low melting point fibers and bonding them to the high melting point fibers to form a seat cushion. Hot and cool gases are flowed through the bed of fibers to effect the heating/cooling.

3 Claims, 5 Drawing Sheets

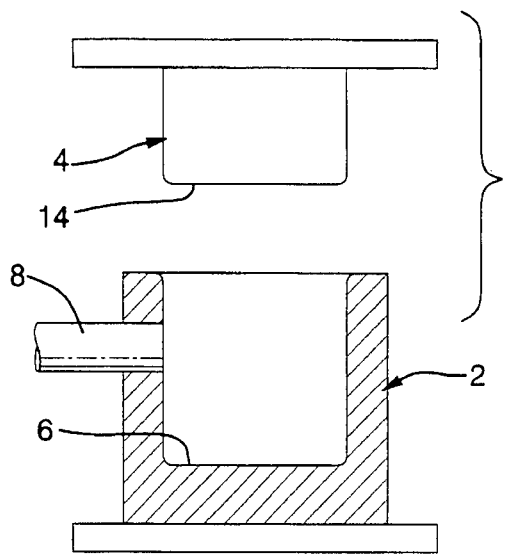
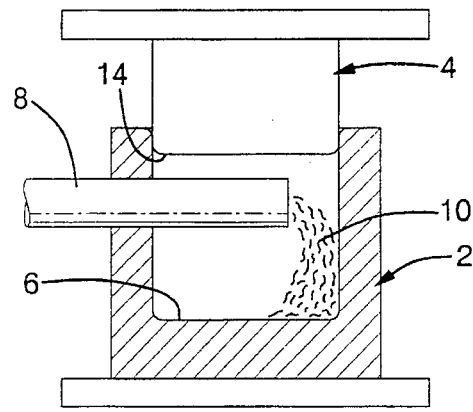
FIG. 1A    FIG. 1B
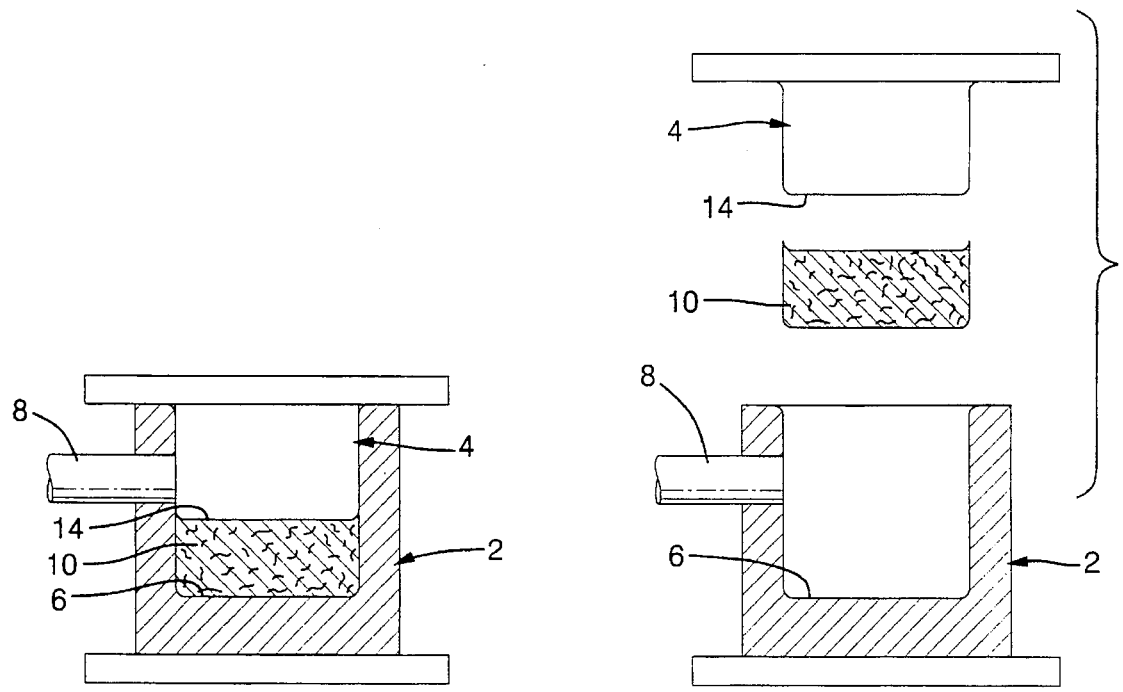
FIG. 1C    FIG. 1D

METHOD FOR MAKING FIBER-FILLED BOLSTERED CUSHION

This invention relates to a method for making cushions having a bolster on each side thereof by blowing different amount of a mixture of high and low melting polymeric fibers into different zones of a mold, shaping the fibers in the mold and heating the fibers sufficiently to fuse the low melting fibers to the high melting fibers.

BACKGROUND OF THE INVENTION

Fiber cushions (i.e., seats and backrests) are more durable, more breathable, less costly, and more readily recyclable than foam and do not emit gases during processing. It is known to make fiber-filled cushions from a mixture of high melting point and low melting point fibers by heating the mixture in an oven so as to soften the low melting fibers (hereafter bonding fibers) and unite them with the high melting fibers (hereafter matrix fibers) at their points of intersection, and then cooling the mixture sufficiently to bond the bonding fibers to the matrix fibers. Typically, the bonding fibers comprise only about 25% to about 30% by volume of the fiber mix, but more or less may be used.

Copending U.S. patent application No. 08/214,510, now U.S. Pat. No. 5,482,665, filed Mar. 18, 1994 in the name of P. Gill, and assigned to the assignee of the present invention describes a unique process and apparatus for quickly and substantially uniformly heating a mixture of high and low melting fibers to make a cushion wherein heating and cooling of the fibers is effected by passing hot and cool air respectively through the fiber mass. U.S. Ser. No. 08/214,510 is herein intended to be incorporated by reference.

SUMMARY OF THE INVENTION

The present invention is an improvement on the method disclosed in U.S. Ser. No. 08/214,510, supra and focuses on a technique for making a bolstered cushion having regions of high and low density in a single filling operation. More specifically, the present invention comprehends a technique for making a porous, breathable, recyclable cushion having laterally disposed high density bolsters on either side of a lower density central portion of the cushion for lateral support of the cushion's occupant. According to U.S. Ser. No. 08/214,510 supra, the cushion is made from a mixture of polymeric matrix fibers having a first melting point and polymeric bonding fibers having a second melting point which is lower than that of the matrix fiber wherein the bonding fibers are heat softened and unite with the matrix fibers so as to act like a binder holding the fibers together in a desired shape. The fiber mixture is blown through a plurality of injectors into a mold cavity having a shape conforming substantially to the desired shape of the cushion. The fibers are compressed in the mold cavity by a moveable portion of the mold, and heated gas (preferably air) passed therethrough for a time and at a temperature sufficient to soften and unite the lower melting bonding fibers to the higher melting matrix fibers at their points of intersection. Thereafter, cooling gas (preferably air) is passed through the mixture for a time and at a temperature sufficient to bond the bonding and matrix fibers together such that the mixture retains the shape of the mold cavity.

In accordance with the present invention, the cushion-shaping mold cavity includes first and second zones for respectively shaping the central and lateral bolster portions of the cushion, and the first and second zones of the mold cavity are filled simultaneously, but at different rates such that the second zones of the cavity (i.e., for shaping the denser bolster regions of the cushion) are filled with more fiber and at a faster rate than the first zone for shaping the central region of the cushion. More specifically, higher air pressure and air volume are used in the injectors that blow fibers into the second zones than are used to blow fibers into the first zone.

The invention will be better understood when considered in the light of the following detailed description of certain specific embodiments thereof which is given hereafter in conjunction with the several drawings in which:

DESCRIPTION OF THE DRAWINGS

FIGS. 1A–1D schematically depict the several steps of the basic process;

DETAILED DESCRIPTION OF THE INVENTION

Figure 2:
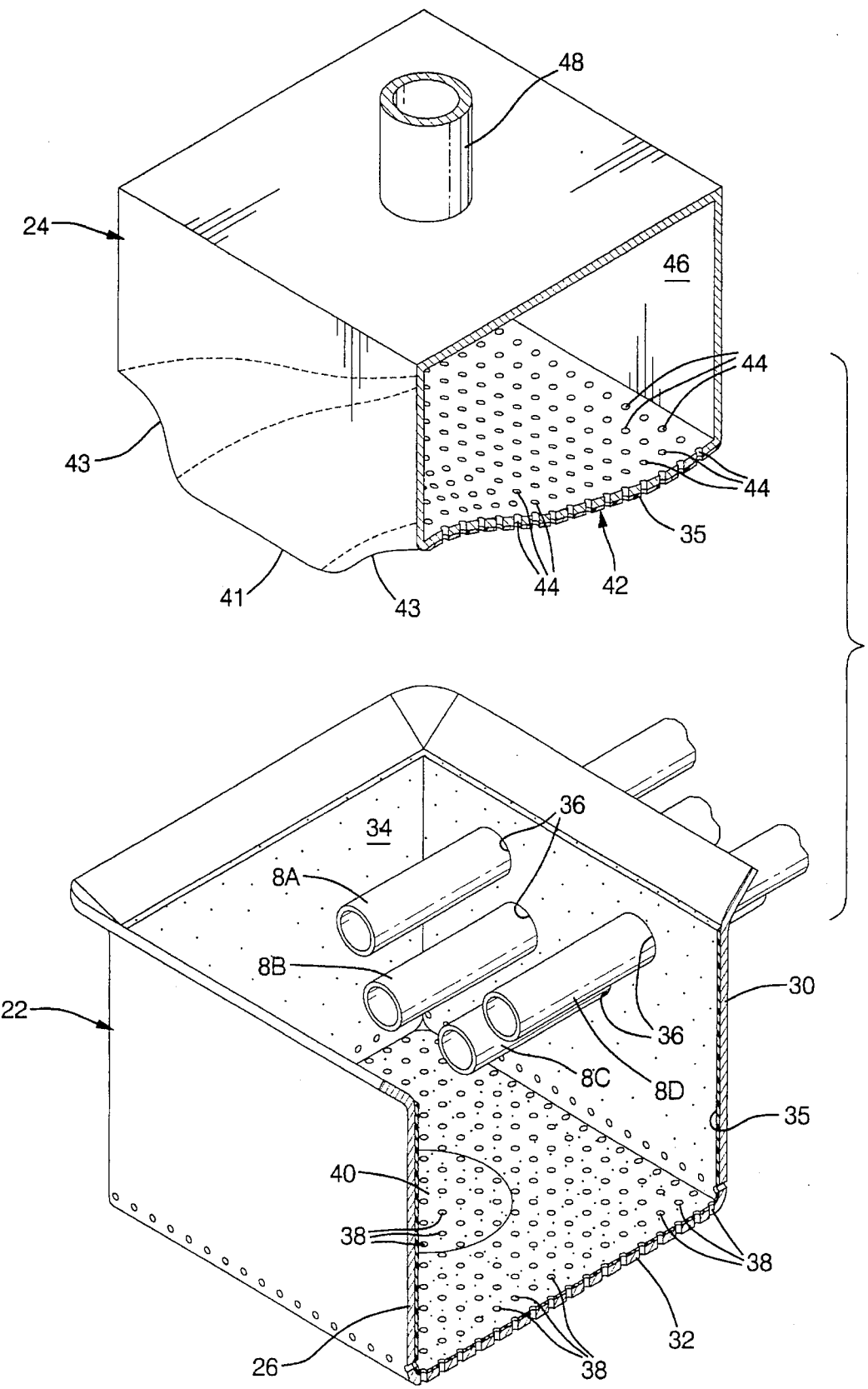
FIG. 2 is a sectioned, perspective view of the male and female mold members in accordance with the present invention.

The fiber mix used to make the cushions in accordance with the present invention will typically comprise about 25 percent to about 30 percent by volume bonding fibers. Preferably, the bonding fibers will have a melting point at least about 60° C. lower than the melting point of the matrix fibers such that substantially only the bonding fibers will soften during the heating step. Most preferably, the melting point differential will be above 70° C.–80° C. Preferably, the melting point of the matrix fibers will be at least about 250° C., and the melting point of the bonding fibers between about 150° C. and about 210° C. In accordance with a most preferred embodiment of the invention, the melting point of the matrix fibers will be at least about 260° C., and the melting point of the bonding fibers will be about 180° C., or more depending on the melting point of the matrix fibers. The fibers will comprise any of a variety of natural or synthetic polymeric materials known to be useful for such applications including polyethylene, polypropylene, polyamide, aramides and polyesters. Commercially available synthetic fibers useful with the present invention include, for example:

1. Polypropylene fibers sold by the Fibres South Co. of Trussville, Ala., under the trade name Poly-Star®;
2. Polyethylene and Polypropylene fibers sold by the Hercules Co. of Norcross, Ga.;
3. Polyethylene Terephthalate fibers sold by the Hoechst Celanese Co. of Charlotte, N.C., under the trade names Treyira and Celbond;
4. Polyamide, aramide and polyethylene terephthalate fibers sold by the E.I. dupont deNemours Co., under the trade names Nylon, Nomex/Kevlar and Dacron, respectively; and
5. Polyethylene terephthalate fibers sold by the Eastman Chemical Products Co. under the trade name Kodel.

Preferably, the fibers will comprise a mixture of high and low melting species of polyethylene terephthalate (hereinafter (PET), because such fibers have better durability, compression recovery and are readily recyclable. Compressed, PET mixtures will have bulk density of about 1.75 lbs./ft.$^3$ to about 2.5 lbs./ft.$^3$ which represents about 2 percent to about 3 percent by volume fibers and the remaining voids (i.e., about 97 percent—98 percent porous).

While for simplicity and recyclability, the bonding fibers will preferably comprise the same type of polymer (e.g., all polyesters) as the matrix fibers, the bonding fibers may comprise a different polymer than the matrix fibers. Hence, for example, polyester matrix fibers may be admixed with polypropylene bonding fibers.

The matrix fibers will vary in length from about 1¼ inches to about 1½ inches, vary in diameter from about 15 denier to about 25 denier, and comprise about 70 percent to about 75 percent by volume of the fiber mixture. Similarly, the bonding fibers will vary in length from about 1¼ inches to about 1½ inches, vary in diameter from about 6 denier to about 9 denier, and comprise about 25 percent to about 30 percent by volume of the fiber mixture.

Cushions are made by blowing the fibers into a porous mold having a moveable member, compressing the fibers in the mold with the member, heating the fibers with hot air passed therethrough and then cooling the fibers with cool air passed therethrough as described in U.S. Ser. No. 08/214,510. The process is readily controllable by simply monitoring the temperature of the heating/cooling gases at different sites in the system. In this regard, the temperature of the gas is measured just before it enters the fiber mixture and again just as it exits the fiber mixture. When the temperature of the exiting gas approaches the temperature of the entering gas, heating is discontinued and cooling gas admitted to the mixture. Thereafter, when the temperature of the cooling gas exiting the mixture approaches the temperature of the cooling gas entering the mixture, the cooling gas is discontinued, the mold opened and the cushion ejected. Preferably the temperature and flow rate of the heating gas is selected so as to soften the bonding fibers after approximately five minutes into the heating cycle.

Preferred apparatus for carrying out the aforesaid process includes a female mold member comprising a plurality of walls defining a mold cavity, at least one of which walls (preferably the bottom wall) is gas permeable. A male mold member, nestable within the mold cavity, is adapted for reciprocal movement into and out of the mold cavity for compressing the fiber mixture therein, and serves to shape the outer surface of the cushion. The male mold member has another gas-permeable wall positioned opposite the gas-permeable wall in the female mold member. A gas plenum system surrounds the gas-permeable walls for providing gases (e.g., air) to the mold cavity for heating and cooling the mixture therein. A source of pressurized gas (e.g., a blower) communicates with the plenum system for pumping gas through the gas-permeable walls and the mixture of fibers in the mold cavity. A heater communicates with the blower for heating the gas to a temperature sufficient to soften the low melting point bonding fibers in the mix. For the quickest cycle time and most uniform properties, the gas flow is preferably evenly distributed across the entire cushion and flows through the thinnest cross section of the cushion (e.g., bottom-to-top of a seat cushion). The direction of flow in the plenum system may be reversed such that either the plenum associated with the female mold portion or male mold portion is the first to receive the gas and the other plenum serves to exhaust the gas.

For filling, a plurality of injectors (preferably four) enter the mold cavity through openings in one of the side walls of the mold for dispensing the mixture of fibers into the cavity from a remote source thereof connected to the other end of the injector. Most preferably, the injectors pass through openings in the side of the mold cavity to deliver the fiber mixture thereto and then retract out of the cavity to permit the male mold member to move unimpeded into and out of the cavity during its compression and retreat cycle. An appropriate drive mechanism (e.g., preferably a ball and screw device) engages the injectors for effecting the movement of the injector into and out of the cavity. Alternatively, hydraulic/pneumatic cylinders or rack and pinion devices could be used for this purpose. The drive mechanism will initially extend the injectors well into the mold cavity (i.e., almost to the wall of the cavity opposite the wall having the hole through which the injector enters the cavity). After the fiber begins to flow from the injectors into the cavity, the injector is slowly retracted from its initial extended position so as to deposit a substantially uniform layer of fibers onto the floor of the mold cavity. A blower (not shown) coupled to the plenum associated with the male mold member causes a current of downwardly flowing air to pack the fibers into the bottom of the mold cavity. The fibers will preferably be fed into the injectors by means of jets of gas (i.e., air) flowing into the other end of the injector so as to create a vacuum and draw airborne fibers into the injector from a source of such fibers. In accordance with the present invention, higher gas pressures and flow rates will be used in some of the injectors than in others to draw more fibers into the injectors under high gas pressure per unit of time and deposit such fibers in select zones of the mold cavity. Hence for making a cushion having a relatively low density central portion flanked by lateral bolster portions of higher density, the outermost injectors feeding the bolster-forming zones of the mold cavity will have higher pressure air fed thereto than the inboard injector feeding the central zone of the mold cavity.

A stripper plate engages the cushion in the cavity for ejecting the cushion from the cavity after the cushion has cooled sufficiently for the cushion to retain the desired shape. The stripper plate forms a part of one of the walls of the mold cavity (preferably the gas-permeable wall) and serves to eject the cushion from the mold cavity upon completion of the heating/cooling cycle. The surfaces of the mold cavity and the male mold member which contact the fibers are preferably coated with a fluorocarbon (e.g., polytetrafluoroethylene, or the like) to prevent the heated fibers from adhering to such surfaces. Temperature sensors (e.g., thermocouples) are provided in the gas plenums adjacent the gas-permeable walls to measure the gas temperature thereat and provide appropriate signals for controlling the process.

FIGS. 1A–1D illustrate the basic process which is the subject of U.S. Ser. No. 08/214,510, supra. In FIG. 1A, the female mold member 2, and male mold member 4 are in the open position before fibers are introduced into the cavity 6 from the injector 8. FIG. 1B depicts the beginning of the process wherein the male mold member 4 is in the semi-closed position with respect to the female mold member 2 and the injector 8 extends well into the cavity 6 to dispense the fibers 10 therein. FIG. 1C depicts the injector 8 in the retracted position, and the male mold member 4 fully inserted into the female mold member 2 to compress the fibers 10 in the mold cavity 6. In this position, heated gas is blown through the fiber mix 10 to soften the low temperature bonding fibers and unite them to the high temperature matrix fibers. Thereafter, cool air is blown through the fiber mix 10 to solidify the low melting fibers and bond them to the high melting fibers. Finally, FIG. 1D shows the male member 4 in a fully opened position, and the cushion formed by the fiber mixture 10 ejected from the mold.

FIG. 2 illustrates a female mold member 22 and male mold member 24 in the mold-open position. The female mold member 22 comprises a plurality of walls 26, 28, 30 and 32 defining a mold cavity 34. A plurality of openings 36 are provided in the side wall 30 to receive a plurality of injectors 8A–8D from the filling machine, as will be described in more detail hereinafter. The bottom wall 32 of the mold 22 comprises a plurality of apertures 38 so as to render the bottom wall 32 permeable to gas. The centermost portion 40 of the wall 32 serves as a stripper plate for ejecting the cushion from the cavity 34 at the end of the processing cycle as will be described in more detail hereinafter. The male mold member 24 comprises a lower wall 42 for shaping the upper surface of the cushion and has a plurality of apertures 44 therein for rendering the wall 42 gas permeable. The gas-permeable wall 42 is backed up by a plenum 46 which, in turn, is connected to a conduit 48 for exhausting (or providing as appropriate) heating and cooling gases from the plenum 46. The permeable wall 42 of the male mold member 24 is contoured to shape the outer surface of the cushion, and includes a first central portion 41 defining a first zone in the mold cavity which shapes the central region of the cushion, and a pair of contoured lateral portions 43 and 45 which rise above the central portion 41 for shaping bolsters along the sides of the cushion. The contoured portions 43 and 45 define second zones of the mold cavity where higher density loadings of fibers are to be deposited to provide lateral bolsters which are integral with, but higher density than, the central region of the cushion. The central zone of the mold cavity defined by the wall portion 41 is fed fibers under relatively low air pressure/ volume from the inboard injectors 8B and 8C while the lateral or second zone portions of the mold cavity are fed fibers under relatively high air pressure/volume from the outermost injectors 8A and 8D.

Figure 3:
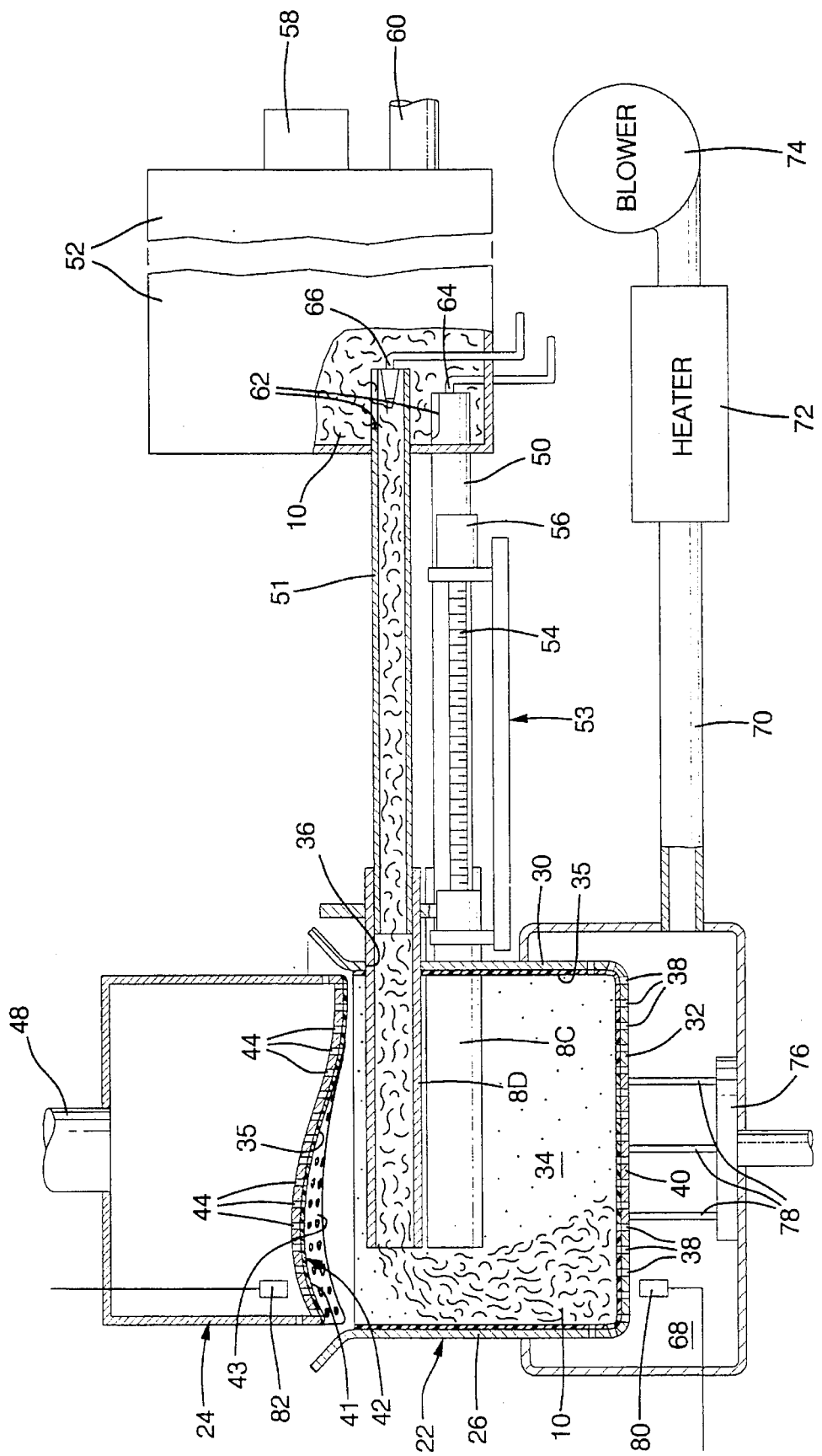
FIGS. 3–5 are partially sectioned, side views of the apparatus of the present invention at different stages in the process.
Figure 4:
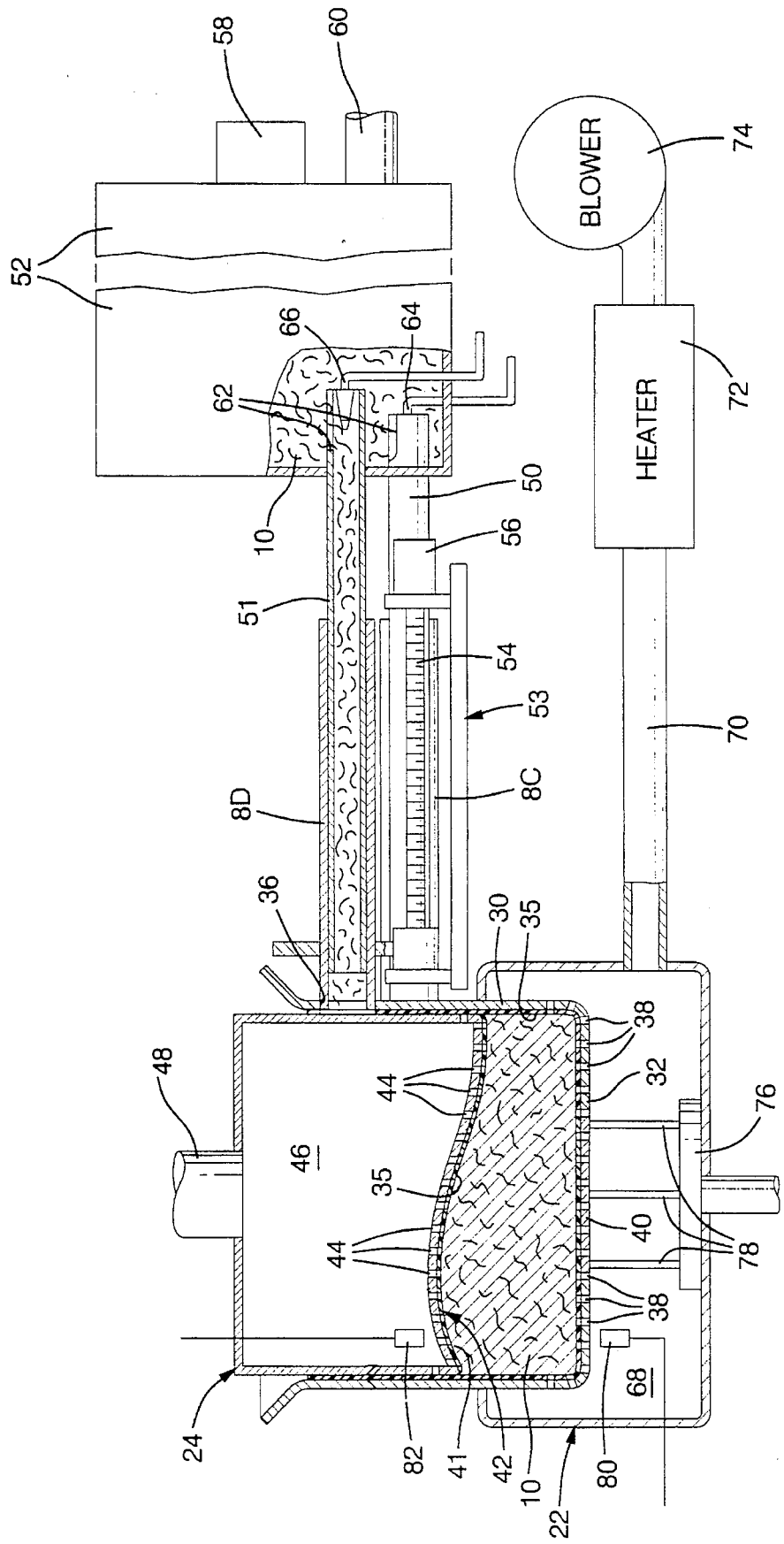
Figure 5:
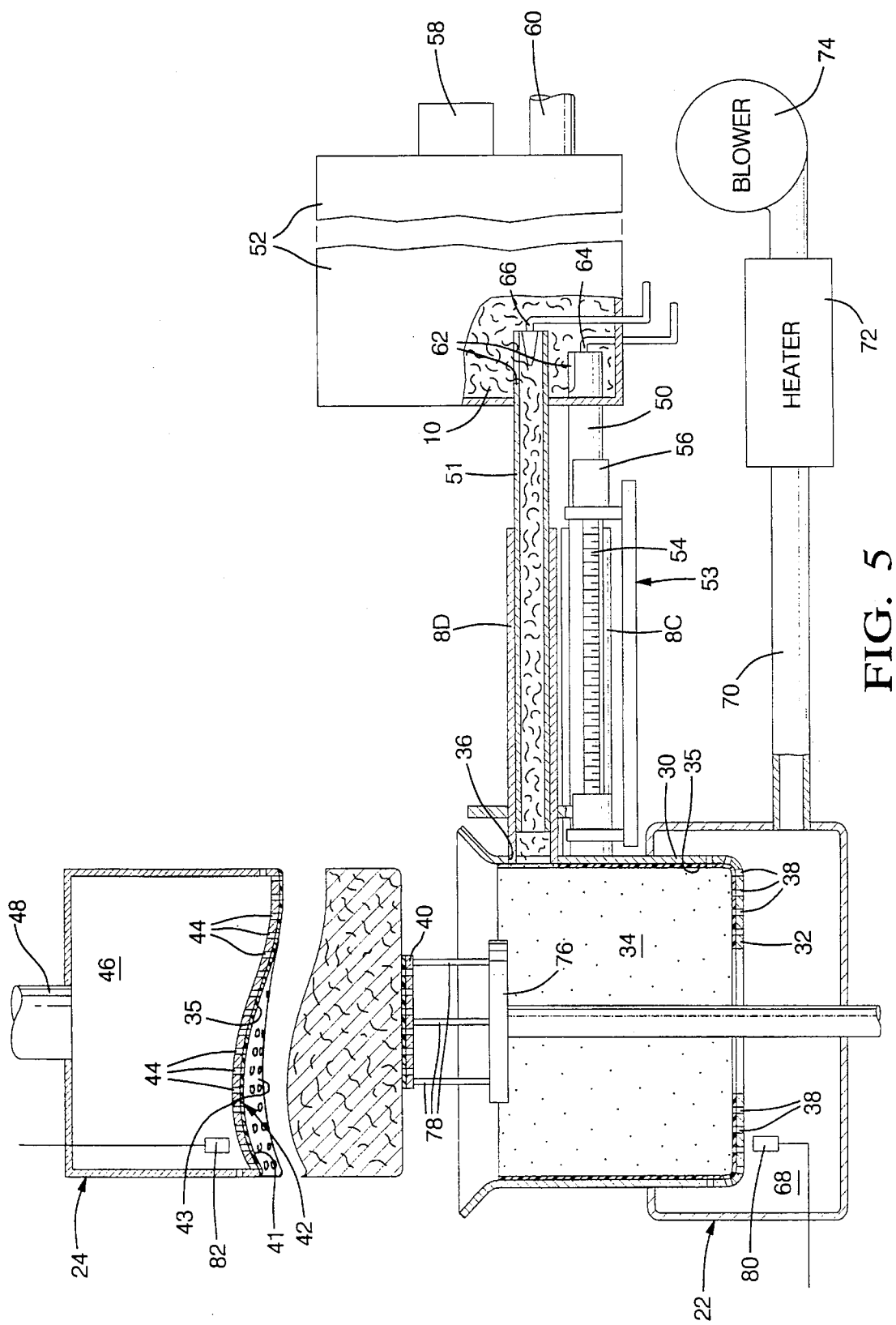

FIGS. 3–5 depict apparatus for making cushions according to the process described above with different components of the apparatus in different positions at various times in the cycle. FIG. 3 shows the apparatus essentially at the beginning of the process with the male mold member 24 in a semi-closed position at the mouth of the cavity 34 in the female mold member 22. The injectors 8C and 8D (see FIG. 2) extend through the openings 36 to almost the other side of the mold cavity 34 which is itself, along with the wall 42, coated with a Teflon layer 35. Each injector 8A–D fits in telescoping fashion over a three inch diameter stationary feed tube 50 and 51 extending from the filling machine 52, and is caused to move fore and aft by a drive mechanism 53 which is preferably a ball and screw type linear actuator 54 powered by reversible motor 56. Alternative drive mechanisms include pneumatic/hydraulic cylinders, rack and pinion gears, or the like (not shown). The injectors 8 move slowly from the fully extended position shown in FIG. 3 to the retracted position shown in FIG. 4 as they dispense the fibers 10 into the mold cavity 34 so as to provide a substantially even distribution of the fibers in the cavity 34. At the same time, the plenum 46 in the upper mold member 24 is pressurized with air so as to provide a current of downwardly moving air which serves to help distribute the fibers evenly while packing them in the bottom of the mold cavity 34.

The filling tubes (e.g., 50 and 51) are connected to a filling machine 52 which is essentially a commercially available machine marketed for filling pillows with fibers and sold by the Ormont Corporation as their Model No. TRP11 Commander filling machine. That machine essentially includes a motor 58 for driving a plurality of impellets or blades (not shown) inside the machine for keeping the fibers stirred up and airborne in the machine 52. A conduit 60 delivers the fibers to the machine 52 from a remote source thereof (not shown). The end of each filling tube 50 and 51 inside the filling machine 52 is open at the top 62 for admitting the airborne fibers to the tubes 50 and 51. Nozzles 64 and 66 emit a jet of air into their associated filling tubes 50 and 51, respectively, which draw fibers into the tubes 50 and 51 through the openings 62 and convey them down the tubes 50 and 51 through the injectors 8C and 8D into the mold cavity 34. The air pressure and volume provided by nozzle 66 to the tube 51 and injector 8D is higher than the air pressure and volume provided by nozzle 64 to tube 50 and injector 8C. Hence, more fibers are sucked into tube 51 than tube 50 and correspondingly more fibers are packed into the bolster-forming zone of the mold cavity fed by injector 8D than the central zone of the cavity fed by injector 8C. Similarly injector 8A will have a higher air pressure/volume than injector 8B for packing more fibers into the bolster-forming zone of the cavity defined by the contoured lateral portion 43 of wall 42.

The bottom wall 32 of the mold 22 includes a plurality of apertures 38 so as to render the bottom wall permeable to gases. Similarly, the bottom wall 42 of the male mold member 24 contains a plurality of perforations 44 for the same reason. The bottom of the female mold 22, and hence the gas-permeable wall 32, is encompassed by a plenum 68 which is connected to a conduit 70 for supplying or removing the gases from the plenum 68 as needed. A heater 72 is coupled to the conduit 70 and to a blower 74 for heating air passing through the conduit 70 when the blower 74 is energized to pressurize the plenum 68.

A stripper plate 40 forms part of the perforated wall 32 and is connected to an elevator 76 by means of rods 78 for ejecting the cushion from the mold cavity 34 upon completion of the heating/cooling cycle. Temperature sensors 80 and 82 (e.g., thermocouples) are provided in the plenums immediately adjacent the walls 32 and 42 respectively for sensing the temperature of the gas at those locations and sending suitable signals to appropriate controllers (not shown) for controlling/automating the process.

FIG. 4 is like FIG. 3 except that it shows the injectors 8D and 8C in the fully retracted positions along the tubes 50 and 51, and the male mold member 24 fully seated in the female mold 22 compressing the fiber mixture 10 to the desired shape. This position is retained during the heating and cooling cycle which begins by the blower 74 pumping gas (i.e., air) through the heater 72 into the conduit 70 and plenum 68, through the gas-permeable wall 32 and the fiber bed 10, and finally exhausting the gas from the bed 10 out the pipe/duct 48 via the gas-permeable wall 42 and plenum 46. Hot air flow continues until the temperature sensed at the sensor 82 approaches that sensed at the sensor 80 which is indicative of the fact that the fibers 10 are substantially uniformly heated throughout and can absorb substantially no additional heat. At this point in time, the heater 72 is shut off, and ambient or cool air pumped into the plenum 68 and through the fiber mixture to cool and bond the low melting point fibers to the high melting point fibers at the intersections thereof. Cooling continues until the temperature at sensor 82 drops to approximately the temperature sensed at sensor 80 which is indicative that the fibers 10 have cooled sufficiently as not to give off any additional heat, and accordingly have bonded the low melting point fibers to the high melting point fibers sufficient for the cushion to retain the shape provided during the compression step.

Finally, and as shown in FIG. 5, after the fibers 10 have cooled sufficiently to fix the shape of the cushion, the male mold member 24 is retracted to the fully opened position and the stripper plate 40 lifted, via the elevator 76, to eject the cushion from the female mold 22. After the cushion is removed the elevator 76 descends until the stripper plate 40 repositions itself with the wall 32.

While the invention has been disclosed in terms of certain specific embodiments thereof, it is not intended to be limited thereto, but rather only to the extent set forth hereafter in the claims which follow.

What is claimed is:

1. A method of molding a porous, breathable cushion having a relatively low density central region flanked by lateral regions having a higher density than said first region comprising the steps of:

a. providing a mold having a moveable member moveable between a mold-open and a mold-closed position so as to define a cavity conforming substantially to the desired shape of said cushion in the mold-closed position, said cavity having first and second zones for respectively shaping said central and lateral regions;

b. blowing a mixture of polymeric matrix fibers having a first melting point and polymeric bonding fibers having a second melting point lower than said first melting point into said mold via a carrier gas, said mixture being blown into said second zones at a faster rate than said first zone to provide a higher density of said fibers in said second zones than said first zone;

c. moving said moveable member to said mold-closed position following said blowing so as to compress said fibers in said mold cavity to a first density in said first zone and a second density in said second zones which is greater than said first density; then d. passing a heated gas through the compressed mixture for a time and at a temperature sufficient to soften said bonding fibers and unite them with said matrix fibers at their points of intersection;

e. passing a cooling gas through the compressed mixture for a time and at a temperature sufficient to bond said bonding fibers to said matrix fibers such that said mixture retains said shape after said mold is opened; and f. removing said cushion from said cavity.

2. A method according to claim 1 including blowing said mixture into said mold cavity progressively from one end of said mold to the other end thereof via a plurality of injectors which travel from said one end to said other end during said blowing.

3. a method according to claim 2 wherein said carrier gas in said injectors feeding said second zones is at a higher pressure than said carrier gas in said injectors feeding said central region.

* * * * *